United States Patent [19]

Ihm et al.

[11] Patent Number: 5,310,504
[45] Date of Patent: May 10, 1994

[54] PHOSPHOR SLURRY COMPOSITION FOR COLOR BRAUN TUBES

[75] Inventors: Ikchull Ihm; Minho Kim, both of Kyunggi-do, Rep. of Korea; Ichull Ihm

[73] Assignee: Samsung Electron Devices Co., Ltd., Rep. of Korea

[21] Appl. No.: 925,852

[22] Filed: Aug. 6, 1992

[30] Foreign Application Priority Data

Aug. 21, 1991 [KR] Rep. of Korea .................. 91-14416

[51] Int. Cl.$^5$ .............................................. C09K 11/02
[52] U.S. Cl. ................... 252/301.36; 427/64; 427/68
[58] Field of Search ............ 252/301.36; 427/64, 427/68; 428/404, 407

[56] References Cited

U.S. PATENT DOCUMENTS 3,887,753  6/1975  Ninagawa et al. ............ 252/301.36

FOREIGN PATENT DOCUMENTS

| 49-21831 | 6/1974 | Japan | 428/404 |
| 57-20651 | of 1982 | Japan . | |
| 59-19156 | of 1984 | Japan . | |
| 62-110230 | of 1987 | Japan . | |
| 1-213387 | 8/1989 | Japan | 252/301.36 |
| 2-242880 | 9/1990 | Japan | 252/301.36 |
| 990791 | 1/1983 | U.S.S.R. | 252/301.36 |

*Primary Examiner*—Jack Cooper
*Attorney, Agent, or Firm*—Christie, Parker & Hale

[57] ABSTRACT

The present invention discloses a phosphor slurry composition for color Braun tubes comprising deionized water, phosphor powder, polyvinyl alcohol, sodium dichromate, ethyl silicate and zinc sulfate. A color Braun tube manufactured using a phosphor slurry composition of the present invention shows an excellent mirror reflection effect and high luminescent brightness.

1 Claim, No Drawings

PHOSPHOR SLURRY COMPOSITION FOR COLOR BRAUN TUBES

BACKGROUND OF THE INVENTION

1. Field of the Invention

This invention relates to a phosphor slurry composition for color Braun tubes, more particularly, to a phosphor slurry composition comprising an aqueous ethyl silicate solution and an aqueous zinc sulfate solution in addition to the ingredients of the conventional phosphor slurry composition and usable to manufacture color Braun tubes exhibiting significantly increased luminescent brightness.

2. Description of the Prior Art

In general, the inner face of a color Braun tube is provided with a fluorescent screen which contains red phosphor, blue phosphor and green phosphor uniformly deposited thereon. As a method to form such a fluorescent screen, the slurry method is widely used. In this method, a procedure of coating a phosphor slurry composition containing a photoresist material on the inner face of a color Braun tube to form a photoresist film, and carrying out the developing process by exposure to light through a shadowmask is sequentially carried out as to green phosphor, blue phosphor and red phosphor, thereby a fluorescent screen is formed.

As an example of the phosphor slurry composition used in the slurry method, a phosphor slurry consisting of phosphor powder, polyvinyl alcohol, sodium hexametaphosphate, sodium dichromate and deionized water is disclosed in Japanese Patent No. Sho 59-19156.

The fluorescent screens produced by using the conventional phosphor slurry compositions have a low packing density of phosphor layer and poor evenness so that the mirror reflection effect of the aluminum vacuum evaporation film will be insufficient, leading to a decrease of luminescent brightness of the fluorescent screens.

Besides the slurry method, the phosphor powder coating method is another method to produce a phosphor coating. This method is disclosed by way of example in Japanese Patent Publication No. Sho 57-20651.

According to this method, when phosphors are coated over the surface of the panel in the shape of fine dots or stripes a in the case of color Braun tubes, parts of the phosphor dots or stripes with the second and/or third color peel off or fail to be deposited to a sufficient thickness, leading to a problem that the obtained fluorescent screen has low grade quality. To solve this problem, in Japanese patent laid-open No. Sho. 62-110230 is disclosed a method which further comprises a step to heat the photosensitive adhesive film prior to the step to deposit each phosphor powders.

However, this method has a defect that a large quantity of heat energy is consumed and the processes get more complicated.

SUMMARY OF THE INVENTION

This invention has been developed to solve the problems of the prior art as described above. Therefore, the object of this invention is to provide a phosphor slurry composition which can be used to manufacture color Braun tubes exhibiting increased luminescent brightness due to the fact that a high packing density of phosphor layer and good evenness of fluorescent screen is obtained, thereby the mirror reflection effect of aluminum vacuum evaporation film is improved.

To achieve the above object, the present invention provides a phosphor slurry composition for color Braun tubes, comprising:

a) 100 parts by weight of phosphor powder,
b) 120–130 parts by weight of polyvinyl alcohol,
c) 5–6 parts by weight of sodium dichromate,
d) 0.0009–0.5 parts by weight of ethyl silicate,
e) 0.002–0.04 parts by weight of zinc sulfate and
f) 120–130 parts by weight of deionized water.

DESCRIPTION OF THE PREFERRED EMBODIMENTS

According to the present invention, the added amount of ethyl silicate is preferably in the range of from 0.0009 to 0.5 parts by weight based on 100 parts by weight of phosphor. When it is added in the amount of less than 0.0009 parts by weight, it can not be anticipated to obtain an increased packing density. On the contrary, when it is added in the amount of more than 0.5 parts by weight, the dispersity of the phosphor can be lowered. Ethyl silicate is generally added in the form of a solubilized aqueous solution into the phosphor slurry composition.

In the composition of the present invention, dichromate is used as a photosensitive agent and polyvinyl alcohol is used as a photosetting binder.

According to the present invention, the added amount of zinc sulfate is preferably in the range of from 0.002 to 0.04 parts by weight based on 100 parts by weight of phosphor. When it is added in the amount of less than 0.002 parts by weight, partial peeling off of the fluorescent screen can occur due to insufficient adhesion between the fluorescent screen and the inner face of the panel. On the contrary, when it is added in the amount of more than 0.04 parts by weight, the adhesive power is so high that the so-called residual color phenomenon owing to a poor resolution can occur in the resolution of the fluorescent screen.

A typical method to manufacture a fluorescent screen using a phosphor slurry composition for color Braun tubes according t the present invention is as follows.

(A) Preparation of a phosphor slurry composition for color Braun tubes

A predetermined amount of green, blue or red phosphor are added with deionized water and polyvinyl alcohol, and is added with sodium dichromate, to this mixture are added an aqueous ethyl silicate solution and an aqueous zinc sulfate solution instead of an surface active agent used in the prior art. Then, the obtained mixture is charged into a ball mill and subjected to milling at 10–300 rpm for 3–15 hours to prepare a phosphor slurry composition for color Braun tubes.

The ball mill container is desirably one with its interior made of PVC in order to inhibit the phosphor surfaces from being damaged. To achieve the optimum effect of ball milling, it is desirable to fill the phosphor slurry to 70–80 percent of the total volume of the ball mill container. At this time, it is desirable to add a suitable amount of alumina balls or glass balls to increase the dispersion effect.

(B) Manufacturing of a fluorescent screen

A given amount of a photosetting resin which has the photoadhesive property when being exposed to ultraviolet light is coated on the inner face of panel of a Braun tube and dried, thereafter it is exposed to light to form a photoadhesive film. On this film, the green phosphor slurry obtained from the process of (A) above described is coated and dried, then exposed to light using a high-pressure mercury lamp. After the exposure is ended, washing with war water is carried out to obtain a green phosphor screen with a uniform stripe or dot pattern. Subsequently, the same procedure as above is repeated sequentially with blue phosphor and red phosphor to prepare a fluorescent screen.

EXAMPLES AND COMPARATIVE EXAMPLES

Now, examples and comparative examples will be presented to illustrate this invention. However, it is understood that this invention is not limited to these examples.

EXAMPLE 1

After the following ingredients were mixed and milled in a ball mill at 150 rpm for 10 hours to prepare a phosphor slurry composition, the commonly used process for manufacturing a fluorescent screen was carried out using the obtained phosphor slurry compositions to manufacture a fluorescent screen.

| Ingredients | Amounts |
| --- | --- |
| ZnS: Ag phosphor powder | 1.0 kg |
| Polyvinyl alcohol | 1.3 kg |
| Sodium dichromate | 0.06 kg |
| 3 wt % aqueous ethyl silicate solution | 20 ml |
| 2 wt % aqueous zinc sulfate solution | 5 ml |
| Deionized water | 1.3 kg |
| Glass ball | 1.0 kg |

EXAMPLE 2

After the following ingredients were mixed and milled in a ball mill at 150 rpm for 10 hours to prepare a phosphor slurry composition, the commonly used process for manufacturing a fluorescent screen was carried out using the obtained phosphor slurry compositions to manufacture a fluorescent screen.

| Ingredients | Amounts |
| --- | --- |
| $Y_2O_2S$: Eu phosphor powder | 1.0 kg |
| Polyvinyl alcohol | 1.2 kg |
| Sodium dichromate | 0.05 kg |
| 3 wt % aqueous ethyl silicate solution | 15 ml |
| 2 wt % aqueous zinc sulfate solution | 5 ml |
| Deionized water | 1.2 kg |
| Glass ball | 1.0 kg |

COMPARATIVE EXAMPLE 1

After the following ingredients were mixed and milled in a ball mill at 150 rpm for 10 hours to prepare a phosphor slurry composition, the commonly used process for manufacturing a fluorescent screen was carried out using the obtained phosphor slurry compositions to manufacture a fluorescent screen.

| Ingredients | Amounts |
| --- | --- |
| ZnS: Ag phosphor powder | 1.0 kg |
| Surface active agent (Tritol-CF54, SIGMA Co. Ltd., U.S.A.) | 100 ml |
| Polyvinyl alcohol | 1.2 kg |
| Ethylene glycol | 60 ml |
| Sodium dichromate | 0.05 kg |
| Deionized water | 1.3 kg |

COMPARATIVE EXAMPLE 2

Except that the amount of 3 wt % aqueous ethyl silicate solution was changed to 0.2 ml, a substantially similar procedure as Example 1 was repeated to manufacture a fluorescent screen.

COMPARATIVE EXAMPLE 3

Except that the amount of 3 wt % aqueous ethyl silicate solution was changed to 170 ml, a substantially similar procedure as Example 1 was repeated to manufacture a fluorescent screen.

COMPARATIVE EXAMPLE 4

Except that the amount of 2 wt % aqueous ethyl silicate solution was changed to 0.5 ml, a substantially similar procedure as Example 1 was repeated to manufacture a fluorescent screen.

COMPARATIVE EXAMPLE 5

Except that the amount of 2 wt % aqueous ethyl silicate solution was changed to 25 ml, a substantially similar procedure as Example 1 was repeated to manufacture a fluorescent screen.

With the fluorescent screens manufactured in the above Example 1 to 2 and Comparative examples 1 to 5, reflection efficiency of aluminium vacuum evaporation film and luminescent brightness of color Braun tube were measured according to the following methods.

The obtained results will be listed in table 1 below.

TABLE 1

Test results of fluorescent screens

| Example No. | Reflection efficiency of aluminium vacuum evaporation film 1) | Luminescent brightness of Braun tube 2) |
| --- | --- | --- |
| Example 1 | 80% | 111% |
| Example 2 | 78% | 108% |
| Comparative example 1 | 60% | 100% |
| Comparative example 2 | 59% | 99% |
| Comparative example 3 | 62% | 101% |
| Comparative example 4 | 61% | 101% |
| Comparative example 5 | 63% | 103% |

Note:
1) The value obtained from measurement of reflection efficiency for the aluminium vacuum evaporation film using a Spectrogard Color System, Pacific Scientific Co., Ltd.
2) The relative value obtained from comparing the luminescent brightness measured at 23.5 kV, 500 μA using a MECC system to that measured with the fluorescent screen of Comparative example 1.

As is apparent from the results of table 1, the luminescent brightnesses of the fluorescent screens in Example 1 and 2 are higher by 10 percent than that of the fluorescent screen manufactured in Comparative example 1 using a conventional phosphor slurry composition. Also, it is apparent from the above test results of Comparative examples 2 t 5 that the added amounts of ethyl silicate and zinc sulfate are desirably each in the range of from 0.0009 to 0.5 percent by weight and from 0.002 to 0.04 percent by weight based upon the phosphor in a phosphor slurry composition of the present invention.

What is claimed is:

1. A phosphor slurry composition for color Braun tubes comprising:
   a) 100 parts by weight of phosphor powder,
   b) 120-130 parts by weight of polyvinyl alcohol,
   c) 5-6 parts by weight of sodium dichromate,
   d) 0.0009-0.5 parts by weight of ethyl silicate,
   e) 0.002-0.04 parts by weight of zinc sulfate and
   f) 120-130 parts by weight of deionized water.

* * * * *

UNITED STATES PATENT AND TRADEMARK OFFICE
CERTIFICATE OF CORRECTION

PATENT NO. : 5,310,504
DATED : May 10, 1994
INVENTOR(S) : Ikchull Ihm; Minho Kim It is certified that error appears in the above-indentified patent and that said Letters Patent is hereby corrected as shown below:

On the Title Page:

[75] Inventors, change "Ikchull Ihm; Minho Kim, both of Kyunggi-do, Rep. of Korea; Ichull Ihm"

to -- Ikchull Ihm; Minho Kim, both of Kyunggi-do, Rep. of Korea. --

Column 1, line 47, after "stripes" change "a" to -- as --.
Column 2, line 43, after "according" change "t" to -- to --.
Column 3, line 6, change "war" to -- warm --.
Column 4, line 55, change "2 t 5" to -- 2 to 5 --.

Signed and Sealed this

Twenty-fifth Day of October, 1994

Attest:

*Attesting Officer*

BRUCE LEHMAN

*Commissioner of Patents and Trademarks*